Dec. 24, 1963   B. D. AHLQUIST   3,114,955
ARRANGEMENT IN LOAD HOOKS
Filed May 8, 1961
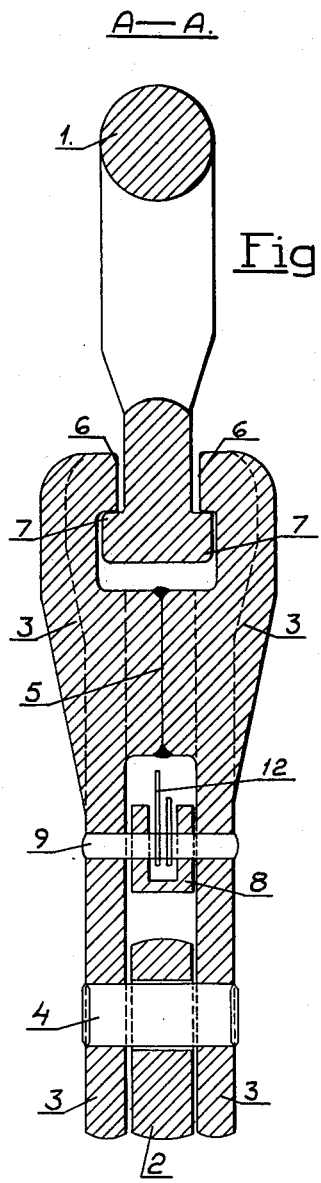
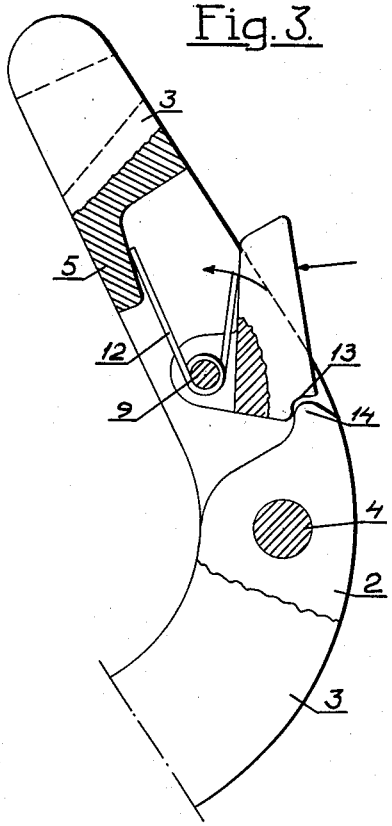
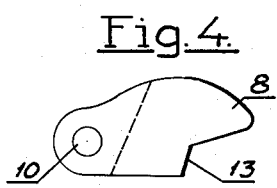
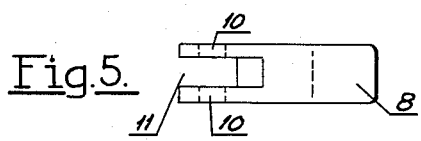

United States Patent Office 3,114,955
Patented Dec. 24, 1963

3,114,955
ARRANGEMENT IN LOAD HOOKS
Bo David Ahlquist, Osterskar, Waxholm, Sweden, assignor to Stallinefabriken, David Ahlquist AB, Roslags-Nasby, Sweden
Filed May 8, 1961, Ser. No. 108,542
Claims priority, application Sweden May 20, 1960
4 Claims. (Cl. 24—241)

The present invention refers to such load hooks for lifting apparatus the lateral opening of which is adapted to be closed by means of a double-armed fork-shaped member swingably arranged on the free end portion of the hook. In load hooks of the above-named type as hitherto-known the upper arm of the closing member is adapted to be blocked by means of a pawl device in the closed position against the upper part of the hook. When the blocking means is disengaged and the hook is completely unloaded, the closing member is freely swingable, and it might then happen that the member swings into its closed position and is blocked therein. When a wire or the like of a lifting contrivance is to be arranged in the hook the blocking means will therefore have to be disengaged to cause the closing member to be swung into its open position, before loading of the hook can take place.

The present invention refers to an arrangement to eliminate said disadvantage in load hooks provided with closing members. The arrangement is substantially distinguished by the feature that the closing member is combined with a pawl adapted automatically to block the member in its closed position to retain the same in the open position when the hook is unloaded.

A load hook combined with an arrangement according to the invention will be described hereinbelow and is illustrated with reference to two annexed drawings.

FIG. 1 of the drawings represents a side view of the hook, and

FIG. 2 shows a section of the same on line A—B.

FIG. 3 shows a modified form of embodiment of the pawl combined with the closing member of the hook, and FIGS. 4 and 5 show lateral views of the pawl.

Figure 1:
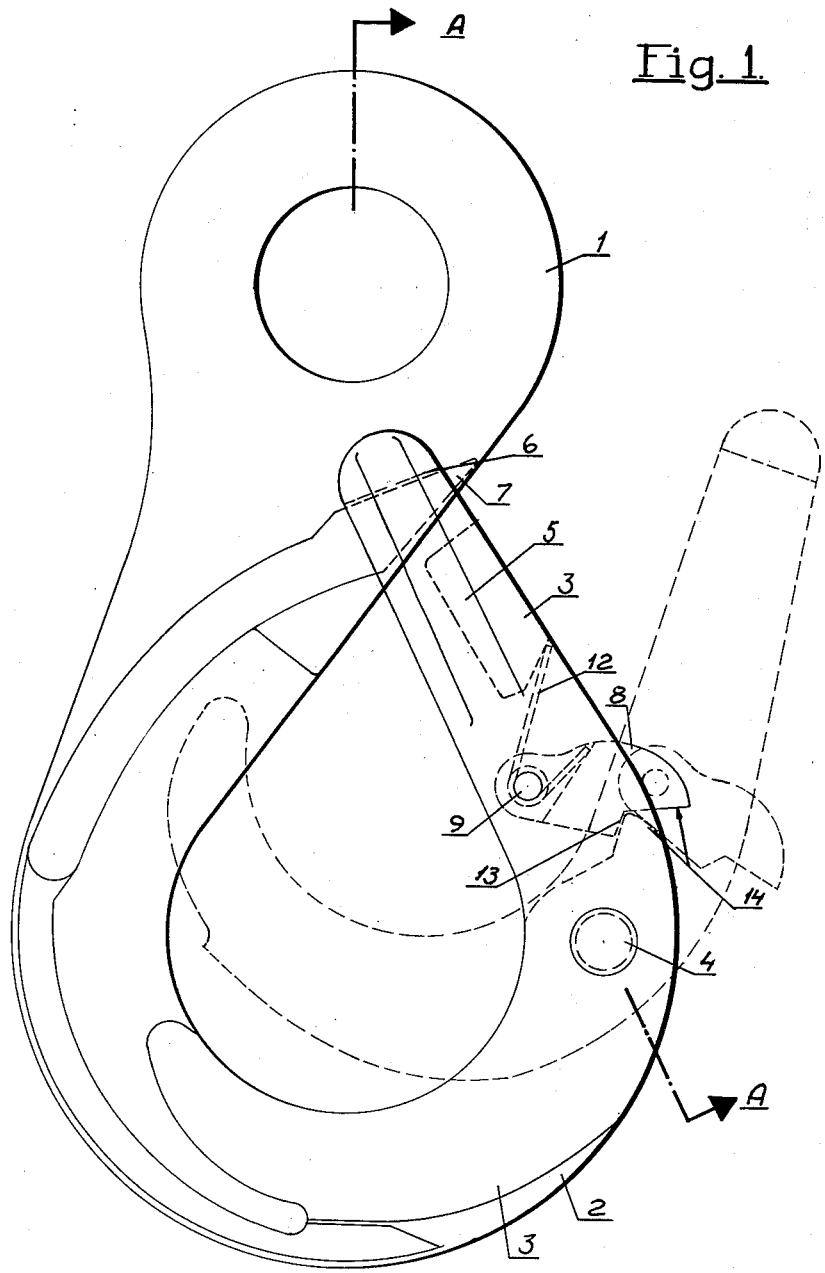

In the drawings, 1 designates the upper-shaped part of the hook for the arrangement of a wire or the like of a lifting contrivance, and 2 denotes the lower semicircular or approximately semicircular part of the hook. 3 designates a fork-shaped double-armed member formed of two parallel parts, said member being swingably connected to the free end portion of the hook by means of a fulcrum pin 4. Said double-armed member is adapted to close the lateral opening of the load hook by its upper arm, which is approximately straight.

The lower portion of the body has a flat parallel-faced central section integral therewith, the central section extending downward from the upper portion in one plane and following substantially the arcuate contour of the corresponding portion of the body.

The lower arm parts of the member 3 are adapted to bear on the sides of the hook member 2, and the inner outlines of the parts are shaped so as to correspond substantially with the inner outline of the hook member. On its straight arm for closing the opening of the hook the parts of the member 3 are provided with adjacent inwardly directed shoulders 5 bearing against each other, said shoulders being rigidly connected together by welding. The end portion of the straight arm of the member 3 is provided with the projections 6 directed inwardly against one another, said projections being adapted, when the member is swung into its closed position against the lateral opening of the hook, to bear on or to approach outwardly directed shoulders 7 on the upper portion of the hook member in order thus to form supports for said member 3 in the lateral directions. The projections 6 and the shoulders 7 may be dimensioned so as to be also capable of resisting tensile strains in the straight arm of the closing member 3 in order thus to increase the strength of the hook member 2 against powerful loading jerks. The numeral 8 designates a pawl arranged between the parallel parts of the straight arm of the member 3, said pawl being swingable on a fulcrum pin 9. The part of the pawl provided with apertures 10 for the pin 9 is U-shaped and arranged to provide a recess for a spring 12 arranged on said pin 9. The pin 9 which is substantially cylindrical is supported by the arms of the forked shaped double armed member 3. The inner portion of the pin fits through the apertures 10 through the wall of the U-shaped portion of the pawl, thereby pivotally supporting the pawl 8. Said pin, is adapted to swing the latter in a direction toward the end portion of the hook member 2. The pawl 8 is provided with a shoulder 13, which is adapted in the closed position of the member 3 to press against a projection 14 formed on the end portion of the hook member 2. The pawl 8 is shaped in such manner as to form a finger grip located outside the end portion of the member 3, by means of which finger grip the pawl is swingable to a swinging position disengaged from the projection 14. As shown in FIG. 1, when the pawl 8 is in the latching position relative to the double-armed member 3, with the shoulder 13 integral with the pawl in engagement with the projection 14 integral with the hook body, the shoulder 13 is substantially perpendicular to a line extending from the axis of the pin 9, to the face of the shoulder 13. Disengagement of the pawl is effected by an outward pressure on the finger grip in the longitudinal direction of the member 3, whereupon said member may swing into the open position shown with dash-lines in the drawing. When the member 3 is swung into its open position, the pawl 8 is arranged to press with its downwardly directed side against the outwardly directed edge portion of the projection 14 in order thus to retain said member 3 in the open position.

In the form of embodiment of the invention shown in FIG. 3 the finger grip of the pawl 8 is shaped in such manner that disengagement of the pawl is effected by pressing the finger grip inwardly in the closing member 3.

The invention is obviously not restricted to the embodiments shown in the drawings, which may be varied within the scope of the invention.

I claim:
1. A hoisting hook comprising, in combination,
   (a) an upper portion having means adapted to be attached to a wire,
   (b) a curved hook body extending downward from said upper portion and then curving upward, the lower portion of said hook body having an outer face thereon, said hook body having a flat parallel-faced central section integral therewith, the central section extending downward from the upper portion, said central section following substantially the curved contour of the hook body, a face substantially perpendicular to the central section in one plane of the central section being formed at the upper end of the central section, said hook body terminating in a projection having an inward facing surface and an outward facing surface,
   (c) a fork shaped double armed member having two arms which extend downward to lie against the flat parallel faces of the central section and substantially conform to the central section of said hook body, said two arms extending apart for a distance above said projection of said hook body, and said two arms being joined forming a solid portion of the upper end of the double armed member,
   (d) a first pin inserted through said central section of said hook body, said first pin being located below the projection integral with the hook body, said first pin extending through said two arms and pivotally securing said fork shaped double armed member to said hook body, (e) a second pin disposed between said arms of said fork shaped double armed member above said projection of said hook body, (f) a pawl rotatably secured between said arms by said second pin, said pawl having one face spacedly located relative to the second pin, said face being substantially perpendicular to a line extending from said second pin to said face of said pawl, when the pawl is located in one position relative to the projection at one end of the hook body, and said pawl having a flat under surface, and (g) spring means rotatably urging said pawl about said second pin so that, when said fork shaped double armed member is pivoted and said arms lie against the central section of said hook body and the solid upper end of said fork shaped double armed member pivots close to the upper portion of said hook body, said spring means rotates said pawl until the face of said pawl engages the inward facing surface of said projection, and, so that, when said pawl is rotated against said spring means, said fork shaped double armed member may be pivoted with the solid upper end away from the upper portion of said hook body and said spring means urges the portion of said flat under surface of said pawl close to said second pin against the outward facing surface of said projection.

2. The combination according to claim 1 wherein said upper portion of said curved hook body has shoulders extending laterally from said hook body and wherein said fork shaped double armed member has upward extensions projecting inward above the solid upper end, said upward extensions projecting inward resting on said shoulders of said hook body when said solid upper end of said fork shaped double armed member is pivoted towards the upper portion of said hook body.

3. The combination according to claim 2 wherein said pawl has an extension extending upward and outward from between said arms so that said extension may be pressed inward pivoting said pawl about said second pin against said spring means.

4. A hoisting hook comprising an upper portion having means adapted to be attached to a wire;

a body of arcuate contour extending downward from said upper portion and then curving upward, the lower portion of said hook body having a flat face on the outer surface thereof, said hook body having a flat parallel-faced central section integral therewith, the central section extending downward from the upper portion, said central section following substantially the arcuate contour of the hook body, a flat face substantially perpendicular to the central section being formed at the upper end of the central section, said hook body terminating in a projection having an inward facing surface and an outward facing surface;

a fork-shaped double armed member having two arms extending downward, said arms being operative to lie against the flat parallel faces of the central section and substantially conform to the central section of the hook body, said arms extending apart for a distance above said portion on said hook body, said two arms being joined into the solid portion of the upper section;

a first pin inserted through the central wall of said hook body, said first pin being located below the projection integral with the hook body, said first pin extending through the two arms to pivotally support the hook-shaped double armed member relative to said hook body, a second pin inserted between the arms of the fork-shaped double armed member above the projection on said hook body;

a pawl rotatably supported between said arms by the second pin, said pawl having a substantially flat latching face integral therewith, and spacedly located relative to the second pin, said flat latching face being substantially perpendicular to a line extending from the second pin to the flat latching face of said pawl when the pawl is in one position relative to the hook body, said pawl having a substantially flat under surface;

a formed spring urging said pawl about said second pin so that, when said fork-shaped double armed member is pivoted and said arms lie against the central section of the hook body, and the solid upper end of said fork-shaped double armed member is moved close to the upper portion of the hook body, said formed spring rotates the pawl until the flat latching face of the pawl engages the inward facing surface of the projection, and so that when the pawl is rotated in the opposite direction against the pressure of the formed spring, the fork-shaped double armed member may be rotated with the solid upper end thereof away from the upper portion of the hook body, said formed spring urging the flat under surface of the pawl located close to the second pin against the outward facing surface of the projection.

References Cited in the file of this patent

UNITED STATES PATENTS

| 2,196,460 | Hertel | Apr. 9, 1940 |
| 2,426,532 | Tierney | Aug. 26, 1947 |
| 2,650,403 | Taylor et al. | Sept. 1, 1953 |
| 2,666,244 | Carmichael | Jan. 19, 1954 |

FOREIGN PATENTS

| 1,180,424 | France | Dec. 29, 1958 |